(12) United States Patent
Spittle et al.

(10) Patent No.: US 8,256,158 B2
(45) Date of Patent: Sep. 4, 2012

(54) VISUAL ATTENUATION COMPOSITIONS AND METHODS OF USING THE SAME

(75) Inventors: Kevin S. Spittle, Vero Beach, FL (US); Marc S. Theisen, Signal Mountain, TN (US); Jessie Clark, Granite Falls, NC (US); James D. Tanner, Northbrook, IL (US)

(73) Assignee: Profile Products LLC, Buffalo Grove, IL (US)

( * ) Notice: Subject to any disclaimer, the term of this patent is extended or adjusted under 35 U.S.C. 154(b) by 511 days.

(21) Appl. No.: 12/496,907

(22) Filed: Jul. 2, 2009

(65) Prior Publication Data

US 2009/0265980 A1   Oct. 29, 2009

Related U.S. Application Data

(63) Continuation-in-part of application No. 12/036,417, filed on Feb. 25, 2008, now Pat. No. 7,752,804, and a continuation-in-part of application No. 11/619,831, filed on Jan. 4, 2007, now Pat. No. 7,854,926.

(60) Provisional application No. 61/077,909, filed on Jul. 3, 2008.

(51) Int. Cl.
*A01G 7/00* (2006.01)

(52) U.S. Cl. .......................................... 47/9; 47/58.1 SC

(58) Field of Classification Search .......... 47/9, 58.1 SC
See application file for complete search history.

(56) References Cited

U.S. PATENT DOCUMENTS

| | | |
|---|---|---|
| 1,962,806 A | 6/1934 | Clapp |
| 2,092,183 A | 9/1937 | Rehfeld |
| 2,158,025 A | 5/1939 | Van Ulst et al. |
| 2,699,629 A | 2/1954 | MacNeil et al. |
| 2,789,399 A | 4/1957 | Finn |
| 2,818,682 A | 1/1958 | Finn |
| 2,825,983 A | 3/1958 | Finn |
| 2,842,897 A | 7/1958 | Finn |

(Continued)

FOREIGN PATENT DOCUMENTS

EP          0 161 766        10/1989

(Continued)

OTHER PUBLICATIONS

Mechanically bonded fiber mulch—draft Abstract, Comparison between Spittle patents '782 (EK and '029 (ES).

(Continued)

*Primary Examiner* — Frank T Palo

(74) *Attorney, Agent, or Firm* — Brooks Kushman P.C.

(57) ABSTRACT

According to one aspect of the present invention, there is provided a visual attenuation composition applicable to a landscape to visually attenuate or camouflage the landscape to approximate color characteristics of the surrounding terrain. The visual attenuation composition includes a colorant selected from the group consisting of a pigment, a dye, and combinations thereof, and optionally includes an additive selected from the group consisting of a flocculent, a tackifier, a stabilizer, and combinations thereof. The visual attenuation composition may further include a liquid medium such as water to form a slurry suitable for spray application. The visual attenuation composition described herein can be combined with a soil treatment product to impart desirable color and colorfastness. Alternatively, the soil treatment product can be first applied to the landscape prior to the application of the visual attenuation composition.

31 Claims, 1 Drawing Sheet

U.S. PATENT DOCUMENTS

| | | | |
|---|---|---|---|
| 2,844,914 A | 7/1958 | Finn | |
| 2,878,617 A | 3/1959 | Finn | |
| 2,879,003 A | 3/1959 | Finn | |
| 2,923,093 A | 2/1960 | Allen | |
| 2,949,871 A | 8/1960 | Finn | |
| 2,951,753 A * | 9/1960 | Groves | 71/1 |
| 2,952,492 A | 9/1960 | Finn | |
| 2,952,493 A | 9/1960 | Finn | |
| 2,990,019 A | 6/1961 | Finn | |
| 3,091,436 A * | 5/1963 | Finn | 366/131 |
| 3,241,173 A | 3/1966 | Finn | |
| 3,292,307 A | 12/1966 | Finn | |
| 3,407,432 A | 10/1968 | Finn | |
| 3,517,514 A | 6/1970 | Visser | |
| 3,644,171 A | 2/1972 | Bevan et al. | |
| 3,696,559 A | 10/1972 | Hatton | |
| 3,712,866 A | 1/1973 | Falconer | |
| 3,763,072 A | 10/1973 | Krieger | |
| 3,772,893 A | 11/1973 | Ellers | |
| 3,812,615 A | 5/1974 | Jamison | |
| 3,818,998 A | 6/1974 | Hessert | |
| 3,881,278 A * | 5/1975 | Videen | 47/9 |
| 3,895,956 A | 7/1975 | Yoshida et al. | |
| 3,899,984 A | 8/1975 | Keyes et al. | |
| 3,942,457 A | 3/1976 | Keyes et al. | |
| 3,950,179 A | 4/1976 | Schneider | |
| 3,973,355 A | 8/1976 | McKenzie | |
| 3,986,365 A | 10/1976 | Hughes | |
| 4,002,034 A | 1/1977 | Muhring et al. | |
| 4,022,633 A | 5/1977 | Schneider | |
| 4,051,086 A | 9/1977 | Reid | |
| 4,058,124 A | 11/1977 | Yen et al. | |
| 4,067,140 A | 1/1978 | Thomas | |
| 4,128,692 A | 12/1978 | Reid | |
| 4,154,174 A | 5/1979 | Rees, Jr. et al. | |
| 4,232,480 A * | 11/1980 | Videen | 47/9 |
| 4,297,810 A | 11/1981 | Hansford | |
| 4,333,461 A | 6/1982 | Muller | |
| 4,337,117 A | 6/1982 | Bodendorf et al. | |
| 4,364,197 A | 12/1982 | Baron | |
| 4,369,597 A | 1/1983 | Leep et al. | |
| 4,414,776 A | 11/1983 | Ball | |
| 4,415,463 A | 11/1983 | Mosier et al. | |
| 4,432,666 A | 2/1984 | Frey et al. | |
| 4,458,042 A | 7/1984 | Espy | |
| 4,476,185 A | 10/1984 | Spittle | |
| 4,551,165 A | 11/1985 | Warner | |
| 4,624,868 A | 11/1986 | Muller | |
| 4,637,759 A | 1/1987 | Owa et al. | |
| 4,693,763 A | 9/1987 | Ross et al. | |
| 4,743,288 A | 5/1988 | Hirsbrunner | |
| 4,787,928 A | 11/1988 | Balassa | |
| 4,790,691 A | 12/1988 | Freed | |
| 4,826,880 A | 5/1989 | Lesniak et al. | |
| 4,919,681 A | 4/1990 | Tyler et al. | |
| 4,921,803 A | 5/1990 | Nohr | |
| 5,007,766 A | 4/1991 | Freed et al. | |
| 5,012,974 A | 5/1991 | Johnson | |
| 5,017,319 A | 5/1991 | Shen | |
| 5,053,482 A | 10/1991 | Tietz | |
| 5,082,500 A * | 1/1992 | Nachtman et al. | 106/162.5 |
| 5,096,748 A | 3/1992 | Balassa | |
| 5,105,577 A * | 4/1992 | Hedges | 47/9 |
| 5,147,441 A | 9/1992 | Megeed | |
| 5,195,465 A | 3/1993 | Webb et al. | |
| 5,207,826 A | 5/1993 | Westland et al. | |
| 5,226,255 A | 7/1993 | Robertson | |
| 5,251,398 A * | 10/1993 | Balassa | 47/2 |
| 5,272,000 A | 12/1993 | Chenoweth et al. | |
| 5,300,192 A | 4/1994 | Hansen et al. | |
| 5,301,460 A | 4/1994 | Corbitt | |
| 5,326,192 A | 7/1994 | Freed | |
| 5,382,610 A | 1/1995 | Harada et al. | |
| 5,447,866 A | 9/1995 | Runyon | |
| 5,456,733 A | 10/1995 | Hamilton | |
| 5,459,181 A | 10/1995 | West et al. | |
| 5,476,711 A | 12/1995 | Hebbard et al. | |
| 5,484,501 A | 1/1996 | Jacobsen | |
| 5,507,845 A | 4/1996 | Molnar et al. | |
| 5,516,830 A | 5/1996 | Nachtman et al. | |
| 5,532,298 A | 7/1996 | Monroe et al. | |
| 5,556,033 A | 9/1996 | Nachtman | |
| 5,567,087 A | 10/1996 | Theisen | |
| 5,616,399 A | 4/1997 | Theisen | |
| 5,649,495 A | 7/1997 | Salestrom | |
| 5,679,364 A | 10/1997 | Levy | |
| 5,741,832 A | 4/1998 | Spittle | |
| 5,779,782 A | 7/1998 | Spittle | |
| 5,849,364 A | 12/1998 | Nachtman et al. | |
| 5,849,645 A | 12/1998 | Lancaster | |
| 5,909,718 A | 6/1999 | Sheehan | |
| 5,916,027 A | 6/1999 | Spittle | |
| 5,942,029 A | 8/1999 | Spittle | |
| 6,029,395 A * | 2/2000 | Morgan | 47/9 |
| 6,076,299 A | 6/2000 | Spittle et al. | |
| 6,096,126 A | 8/2000 | Tanner et al. | |
| 6,135,672 A | 10/2000 | Davidson | |
| 6,155,749 A | 12/2000 | Tanner et al. | |
| 6,156,682 A | 12/2000 | Fletemier et al. | |
| 6,158,167 A | 12/2000 | Spittle | |
| 6,254,654 B1 * | 7/2001 | Van Barneveld | 71/8 |
| 6,293,045 B1 * | 9/2001 | Morgan | 47/9 |
| 6,331,300 B1 | 12/2001 | Dybas et al. | |
| 6,349,499 B1 | 2/2002 | Spittle | |
| 6,351,911 B1 | 3/2002 | Behrens | |
| 6,358,312 B1 | 3/2002 | Tanner et al. | |
| 6,360,478 B1 * | 3/2002 | Spittle | 47/9 |
| D456,224 S | 4/2002 | Lancaster | |
| D456,674 S | 5/2002 | Lancaster | |
| 6,523,299 B2 | 2/2003 | Morris | |
| 6,635,329 B1 | 10/2003 | Arndt et al. | |
| 6,688,038 B1 | 2/2004 | Paternoster et al. | |
| 6,729,068 B2 | 5/2004 | Dooley et al. | |
| 6,729,807 B1 | 5/2004 | Spittle | |
| 6,871,446 B1 * | 3/2005 | Yamashita | 47/58.1 SC |
| 2002/0009622 A1 | 1/2002 | Goodson | |
| 2002/0121046 A1 * | 9/2002 | Yamashita | 47/58.1 SC |
| 2003/0060113 A1 | 3/2003 | Christie et al. | |
| 2004/0091326 A1 | 5/2004 | Spittle | |
| 2004/0202851 A1 | 10/2004 | Goodrum et al. | |
| 2005/0020449 A1 * | 1/2005 | Blais | 504/117 |
| 2005/0229481 A1 * | 10/2005 | Wilson | 47/9 |
| 2006/0070294 A1 | 4/2006 | Spittle | |
| 2008/0163658 A1 | 7/2008 | Spittle | |
| 2008/0202024 A1 | 8/2008 | Spittle et al. | |
| 2009/0265980 A1 * | 10/2009 | Spittle et al. | 47/9 |

FOREIGN PATENT DOCUMENTS

| | | |
|---|---|---|
| EP | 0 492 016 | 9/2002 |
| GB | 2 254 769 | 10/1991 |
| GB | 2 245 555 | 1/1992 |
| JP | 05123063 A | 5/1993 |
| WO | 9107534 | 5/1991 |
| WO | 9108759 | 6/1991 |
| WO | 9207985 | 5/1992 |

OTHER PUBLICATIONS

Erik Skindrud, regional editor "Sowing the Seeds: You Can Add Hydroseeding to Your Contracting Business" (Article), 5 pages.

Canadian Forest Products, Inc. "Tests of Various Rates of EcoAegis and Soil Guard for Erosion Control land Plant Growth Enhancement Under Simulated Rain and Sunlight" —Original Report: Dec. 1995; Corrected and amended: Jun. 1998 (Gilberto E. Urroz, Utah Water Research Laboratory, College of Engineering, Utah State University, Logan, Utah), 15 pages.

Canadian Forest Products Ltd. "Tests of New Erosion Control Product Under Simulated Rain and Sunlight—Test 1" -Jul. 1995 (Gilberto E. Urroz, Utah Water Research Laboratory, College of Engineering, Utah State University, Logan, Utah), 14 pages.

Finn Corporation "Creating the Ideal Growing Environment" (Advertisement), 6 pages.

Canfor "EcoAegis Bonded Fiber Matrix—Control Erosion Better . . . Faster . . . and Easier . . . with Less Risk", 4 pages.

Material Safety Data Sheet—Product Identification and Use; Product Identifier: EcoFibre PLUS TAC, 3 pages.

Cantor Panel and Fibre Marketing Ltd.—EcoFlex Flexible Control Medium—Specifications, 2 pages.

Nissan Kizai Nice, Inc.—Fiber Length "A Factor in Holding Capacity of Woodfiber Mulch" Aug./Sep. 1989, 1 page.

Finn Corporation Spring 1995—Finninfo—News and thoughts from the Finn Corporation, 4 pages.

Finn Corporation—Finn A700 Fiber*Plus Get More out of your Mulch: (1 page) (Duplicate BH).

Jim Lincoln—"Hydro-Mulching—An Overview", 1992, James Lincoln Corp., 8 pages.

IECA Standard Mulch and Mulch Mediums—Mar. 1, 1995, Mulch Standards Comm., Atlanta, 3 pages.

Land and Water—The Magazine of Natural Resource Management and Restoration Sep./Oct. 1992 "Hydraulic Planting" Special Reprinted Edition, 3 pages.

Hugh West, Ph.D., Weyerhaeuser Company—Terrasol Environment Industries "The Function of Continuous Cover in Preventing Soil Erosion from Rainfall Impact and Sheet Flow: The Evolution of Bonded Fiber Matrices", pp. 1-4.

Material Safety Data Sheet—Soil Guard—Weyerhaeuser Company, 2 pages.

Weyerhaueser Soil Guard Bonded Fiber Matrix—The One Step Erosion Control System for Better Performance at a Lower Cost, 8 pages.

Weyerhaeuser—Public Advisory—Weyerhaeuser's Soil Guard Applied to Fire-Ravaged Southern California Coast, 3 pages.

Finn Corporation—Finn Additive System FiberPlus, 1 page.

ASTM International—Designation D638-03 Standard Test Method for Tensile Properties of Plastics, pp. 1-5.

ASTM International—Designation D790-03 Standard Test Methods for Flexural Properties of Unreinforced and Reinforced Plastics and Electrical Insulating Materials, pp. 1-11.

ASTM International—Designation D883-00 Standard Terminology Relating to Plastics, pp. 1-15.

The Commonwealth of Pennsylvania Department of Transportation Roadside Vegetation Management Research Report- Eleventh Year Report, The Pennsylvania State University Research Project #85-08; Report #PA 97-4620 +85-08, Jun. 12, 1997, p. 56.

Canfor Brochure—EcoBlend with Recycled Cellulose—Engineered for Excellence, 2 pages.

ABC Fibers—Technical Data Sheet, Physical Properties: ABC Monofilament Fibers, 2 pages.

ProPlus Hydro Mulching Solutions—FiberLockTM including Guide Specification for Profile FiberlockTm (formerly labeled as Locking Fiber), 7 pages.

ASTM Standard D638, Standard Test Method for Tensile Properties of Plastics—On Order.

ASTM Standard D790, Standard Test Methods for Flexural Properties of Unreinforced and Reinforced Plastics and Electrical Insulating Materials—On Order.

V. Steven Green and D.E. Stott-Polyacrylamide: A Review of the Use, Effectiveness, and Cost of a Soil Erosion Control Amendment, 10th Intl. Soil Conservation Org. Meet., May 24-29, 1999, Purdue.

Donald H. Gray/Robbin S. Sotir—Biotechnical and Soil Bioengineering Slope Stabilization—Practical Guide for Erosion Control, Oct. 1995, 8 pages.

Organic Chemical Process Industry—Emission Factors—Section 6.9 Synthetic Fibers-, Organic Chem. Process Industry, Sep. 1990 (Reformatted Jan. 1995), pp. 6.9-1 to 6.9-22.

Finn Corporation—Finn A500 Hydro-Stick (Articles Instructions for Use etc.), 1998, 7 pages.

Finn Corporation—Finn A700 Fiber-Plus "Get More out of your Mulch", 6 pages.

Material Safety Data Sheet—Identity: Finn FiberPlus Oct. 3, 2002, 2 pages.

Office Action for U.S. Appl. No. 11/619,831 dated Dec. 1, 2009.

* cited by examiner

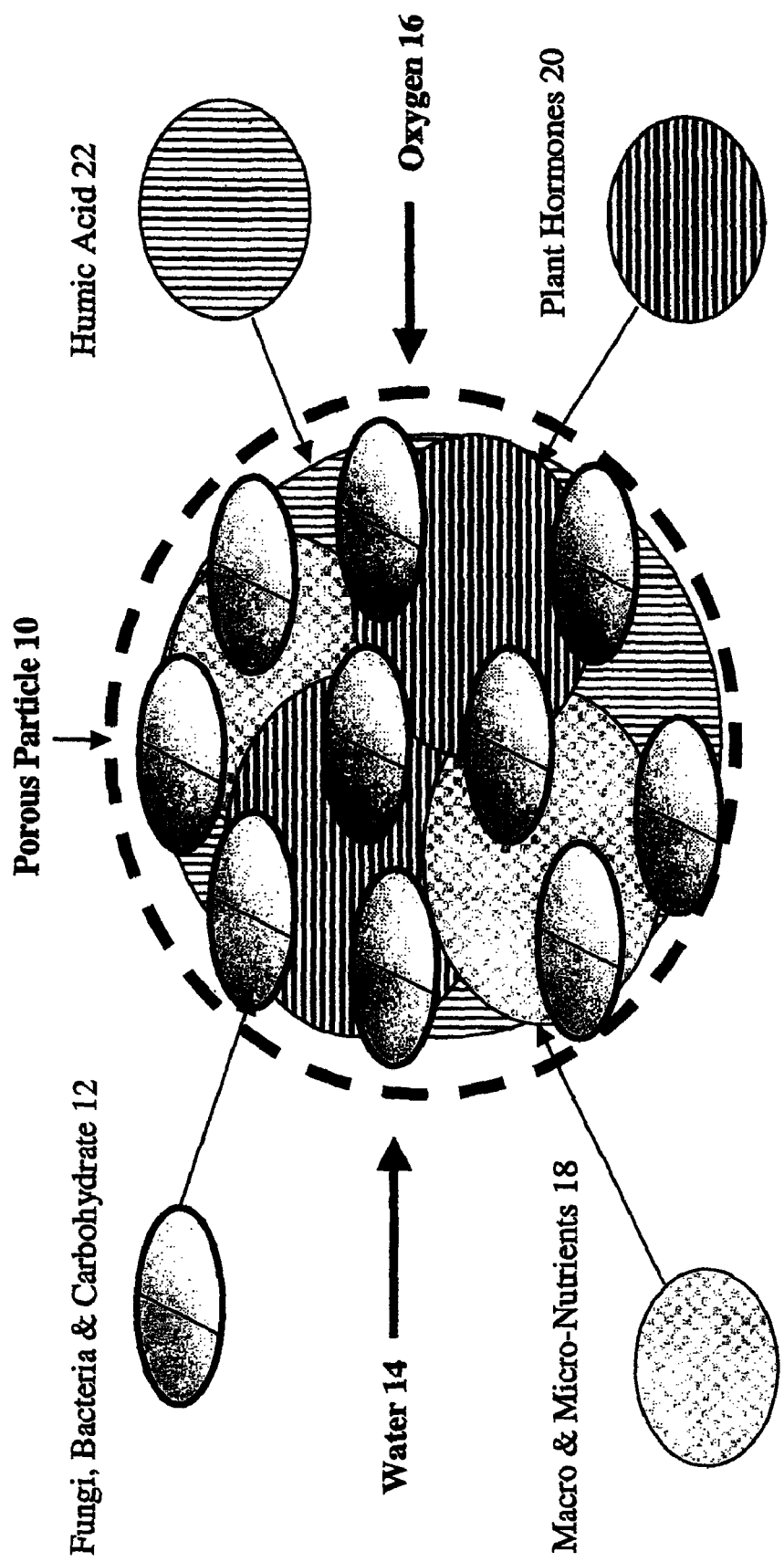

VISUAL ATTENUATION COMPOSITIONS AND METHODS OF USING THE SAME

CROSS-REFERENCE TO RELATED APPLICATIONS

This application is a continuation-in-part of U.S. provisional application Ser. No. 61/077,909, filed Jul. 3, 2008, U.S. utility application Ser. No. 12/036,417 filed Feb. 25, 2008, now U.S. Pat. No. 7,752,804 issued Jul. 13, 2010, and U.S. utility application Ser. No. 11/619,831 filed Jan. 4, 2007, now U.S. Pat. No. 7,854,926 issued Dec. 21, 2010.

BACKGROUND

1. Technical Field

The present invention is directed to compositions to visually attenuate or camouflage a landscape to approximate color characteristics of a surrounding natural terrain, and in particular to sprayable mulch products and soil treatment composition having the visual attenuation features described herein.

2. Background Art

General land constructions include mining, energy and natural resource extraction, and large scale land developing often result in soil bare areas that depreciate the overall aesthetics of the surrounding terrain. For instance, earth change plans (ECP) are developed for areas of soil erosion and sedimentation which may leave bare patches. Bare patches while re-growing may take months and or years to reach the appropriate density to match the surrounding landscape. Current treatments to camouflage areas of the landscape which are incongruous with the surrounding natural terrain include spray paints. However, under high wind conditions the mulches onto which the paints are applied may be scattered. Although the spray paints provide good coverage and camouflage, rainwater has been known to dilute the color of some grass spray paints and prevent uniform attachment. The spray paints are only practical for small patches of brown or faded grass and not useful for completely bare patches of soil or large industrial development project areas.

SUMMARY

According to one aspect of the present invention, a method is provided to visually attenuate a landscape to match color characteristics of a surrounding natural terrain. In one instance, the method includes spray-applying a pre-colored mulch slurry to the landscape for impart a matching color. The colorant can be added to the mulch to form a colored mulch slurry at the site of application. Alternatively, the colorant can be added to the mulch at a manufacturing plant such that the mulch arrives at the site of application pre-colored. In one variation, the method includes the use of a visual attenuation composition including a colorant selected from the group consisting of a pigment, a dye, and combinations thereof, optionally combined with an additive selected from the group consisting of a flocculent, a tackifier, a stabilizer, and combinations thereof. The visual attenuation composition, as applied, can be formulated to impart a color for a period of up to 6 weeks or longer depending upon the particular application at hand. In addition, the visual attenuation composition can be spray-applied to previously applied soil treatment product to impart color reinforcement such that the soil treatment product remains colorfast for a period of up to 6 months or longer.

BRIEF DESCRIPTION OF THE DRAWINGS

FIG. 1 is a diagram of a biological soil treatment composition.

DETAILED DESCRIPTION OF THE PREFERRED EMBODIMENT(S)

The present invention provides compositions for approximating color characteristics of a landscape in view of its surrounding terrain to provide an overall aesthetic value, and method for the use thereof. The surrounding natural terrain may have a color of red, yellow, blue, white, black, orange, pink, green, brown, or any combinations thereof. As used herein, the color characteristics of the surrounding natural terrain are approximated by the color features of the visual attenuated compositions herein when a color difference between the former and the latter can no be observed by ordinary bare eye viewing or the color difference is no more than 30%, 20%, or 10% by a suitable color-measuring method as described herein elsewhere in relation to colorfastness.

It has been found that there is an unmet need in the art for compositions and or methods suitable for camouflaging introduced plant materials, exposed soil and rocks, and other natural features, with their surrounding natural vegetation. It has been further found that there is an unmet need in the art for these compositions compatible with a variety of treatments and materials to re-establish vegetation or reclaim disturbed sites such as erosion control mats and blankets, camouflage fabrics, rock staining products, and hydraulic or straw/hay mulches. The compositions should be capable of attachment to a target surface in order to withstand erosive forces and high winds. Additionally, it would be useful to have a visual attenuation composition which may be applied directly to bare soil areas undergoing remediation, reclamation and re-growth of the terrain.

According to one aspect of the present invention, a visual attenuation composition is provided to be applicable to a landscape to visually attenuate or camouflage the landscape to approximate color characteristics of the surrounding terrain. The visual attenuation composition includes a colorant selected from the group consisting of a pigment, a dye, and combinations thereof, and optionally an additive selected from the group consisting of a flocculent, a tackifier, a stabilizer, and combinations thereof. The visual attenuation composition is optionally formulated into a slurry through, for example, the use of a water-based medium, such that the visual attenuation composition can be spray applied. The composition is optionally supplemented with various soil treatment or growth promoting products to customize the visual attenuation system for the surrounding terrain, i.e. exposed slopes and/or rocky, steep terrain. The hydraulic application method chosen should be adequate to ensure proper mixing and maintain a uniform slurry during dispersal onto the surface of the treatment area.

The visual attenuation composition as described with more details herein elsewhere can also be used to impart a color to a soil treatment product such as a porous blended mulch and a biological soil nutrient composition before application onto a landscape. In particular, the soil treatment product, including the porous blended mulch and the soil nutrient composition described herein, is colored with the visual attenuation composition during manufacture and the resulting soil treatment product is subsequently packaged as being pre-colored. The pre-colored soil treatment product can be added to a hydro-seeder prefilled with a liquid medium such as water to form a slurry and spray-applied by an end user at the site of application. Alternatively, an un-colored soil treatment product can be colored at the site of application upon combination with the visual attenuation composition described herein to form a colored-product for application and optionally for spray application to the landscape.

In certain particular instances, a selection of pigments and or dyes as the colorant, either as a liquid or a powder, is mixed with water in a mixing tank such as a hydro-seeder, to form a colorant/water slurry. The colorant/water slurry is spray-applied onto a landscape and to camouflage the landscape to impart desirable colorfastness while matching the surrounding natural terrain. As used herein, the term colorfast or colorfastness means that the visual attenuation composition retains at least 50% of its color, preferably at least 75% and more preferably at least 80 or 90% after outdoor exposure for a pre-determined period of time. One can measure color by any suitable methods. One example is to capture color images by for instance a digital camera and analyze color intensities by quantifying image pixels. The spray-application may be repeated for additional color reinforcement. The extent of the colorfastness of a treated landscape depend on several factors, including the amount of the colorant used per a given weight of a soil treatment product such as a porous blended mulch and a biological soil nutrient composition as described herein elsewhere. The factors also include a total number of repeating applications, and whether additional color reinforcement agents such as a mordant are used. In general, the visual attenuation composition, for instance in a water slurry, can be formulated considering the factors as illustrated above, to impart colorfastness for a period of up to about 6 months or longer.

In one embodiment, the visual attenuation composition includes approximately 0.1% to 50% by weight of a colorant. When used, a flocculent is added at approximately 0.01% to 2% by weight, a tackifier is added at approximately 0.1% to 5% by weight, and a stabilizer is added at approximately 0.1% to 5% by weight. The visual attenuation composition can be hydraulically applied directly to the surface of the terrain to visually enhance the landscape when viewed from a distance.

When used, the pigments selectively reflect and absorb certain wavelengths of light among themselves, and or in combination with one or more dyes as described herein elsewhere. A non-limiting list of colors includes green, blue, yellow, red, black, and white. These pigments can be used in combination to create a palate to closely match color characteristics of the surrounding terrain. The reflected light spectrum creates the appearance of a color. Sunlight creates a more uniform spectrum than artificial light. There are many pigment groups which may be combined to form specific colors. Some pigment groups are more compatible than others which increases or decreases the intensity of the color. The pigments selected for the visual attenuation system will be taken from pigment groups including but not limited to: arsenic pigments, carbon pigments, cadmium pigments, iron oxide pigments, chromium pigments, cobalt pigments, lead pigments, copper pigments, titanium pigments, ultramarine pigments, mercury pigments, zinc pigments, clay earth pigments (which include iron oxides), pigments of biological origin and other organic pigments.

The pigments can be suspended and diluted in a water-based medium, a spirit-based medium such as an ethanol or methanol based medium. A spirit-based medium such as an acrylic polymer emulsion is preferable in rainy areas because it can be diluted with water but is water-resistant when dry. This makes the composition more colorfast and water-resistant. Spirit-based media with an acrylic polymer emulsion is suitable for use on wood, masonry, plaster and fabric. A water-based composition may be preferable in arid climates to facilitate application. The water-based composition may also be considered when the size of the target terrain is small or a short-term length of time is required for camouflage.

Exemplary tackifiers are dry or liquid blends containing for example, polysaccharides, vegetable gums including guar and xanthum, linear polymers of acrylamide, starches, vinyl copolymers and acrylic resins which have adhesive properties. The tackifiers enable the visual attenuation system to adhere to the target location. The soil tackifiers also increase the colorfastness of the composition. The tackifier is optionally a gel-forming activator. Non-limiting examples for the gel-forming tackifier include a blended, cross-linked, hydrocolloid-based binder with mineral activators. A hydrocolloid is a substance that is capable of forming a gel with water. Macromolecules, such as carbohydrate polymers (e.g. polysaccharides such as cellulose and starch) or a protein, that are water soluble are general examples of hydrocolloids. Specific examples of hydrocolloids include: calcium carboxymethylcellulose, pectin, gelatin, high molecular weight carbowax, carboxypolymethylene, polyvinyl alcohol and guar gum. Natural tackifiers include bentonite clay-based tackifiers, polysaccharides and guar gum.

Without being limited to any particular theory, the tackifier may be multi-functional. When used in forming a slurry, the tackifier coats component fibers and adds viscosity to the slurry. The coated fibers have reduced friction, particularly when preparing the slurry, thereby reducing the stress applied to the mixing machinery and promoting a substantially homogenous slurry. Furthermore, when the slurry is pumped through a hose and nozzle, friction is reduced so that an even and consistent slurry may be applied on the substrate surface having a substantially homogenous matrix. The reduced friction also extends pump life and lowers the requirement for pumping energy. The tackifier may also provide adhesion of fibers to fibers, fibers to soil and soil to soil in the substrate on the ground surface. The component fibers in the slurry lay on a soil surface while the liquid portion of the slurry penetrates to the underlying soil contributing to the binding of component fibers to soil particles, soil particles to soil particles as well as fibers to fibers. Once dried, the component fibers within the substrate are adhered together, forming a water absorbent cover that is porous and breathable and secures soil and seed that may be added in order to enhance the establishment of vegetation. The tackifier also preferably provides wet strength to the erosion control medium. In addition, the erosion control medium can be rewetted over periods of months and still retain its form. Rewetting occurs when the erosion control medium, after it has dried, is subjected to more water. Typically rewetting occurs via precipitous and/or wet weather.

When used as an additive, the stabilizers which may be included in the composition are dry or liquid blends containing for example petroleum resins, coumarone-indene resins, terpene-phenol resins and xylene/formaldehyde resins. The soil stabilizers increase water resistance of the product and reduce dust production.

Similarly, chemical and natural soil flocculants can affect soil physical properties by causing fine particles to bind together into aggregates. A proper balance is required when determining the final percentage of soil flocculation-promoting agents because some such flocculants increase salinity and if the salinity is raised too high, it causes harmful and potentially lethal effects on plants. Soil flocculation and dispersion is desirable in maintaining irrigation and promotes a natural soil texture. When utilized in combination with porous ceramic additives the composition imparts a texture which both promotes visual attenuation and retains the ability to allow water and light to penetrate and promote growth.

In one embodiment, the visual attenuation system is formulated as a slurry sprayable for hydraulic application. The visual attenuation system may be applied by various types of equipment such as pump sprayers, hydro-seeders, hydro-mulchers, water trucks, spray rigs and other apparatus' capable of mixing and maintaining consistent and uniform slurry while evenly applying the slurry at a consistent and even rate. The visual attenuation system should be applied to relatively dry terrain to promote adherence and drying. The amount utilized is dependant upon the amount necessary to provide the desired color. An additional application may be required after drying to obtain the best available match.

The visual attenuation system may be applied directly to the landscape such as a soil surface. It is also useful as a complement to cover soil treatments including hydraulically applied erosion control mulches, rolled erosion control blankets, turf reinforcement mats and other surface applied treatments used to combat erosion and facilitate vegetative establishment. The visual attenuation system may also be premixed, prior to application, with other landscaping materials including hydroseeding/hydromulching compounds, erosion control blankets, geotextiles, fertilizers, weed control agents, growth promoting agents, compost, manure, pesticides and other organic or agricultural by-products such as straw or hay. The later composition is recommended for smaller projects because of the cost associated with the higher pigment-to-material ratio. Generally, the more absorbent the material to be visually modified, the higher the ratio of pigment-to-material required in the visual attenuation system.

The visual attenuation system should be applied as necessary to ensure retention of the proper color match as vegetation and plants become established. The service life of the visual attenuation system will be influenced by a variety of environmental factors such as soil type, moisture, temperature, incoming solar radiation, shading, microbial activity, and snow cover. In addition, human-influenced factors such as degree of disturbance, soil preparation, erosion control practices, revegetation techniques and desired appearance will also dictate rate and frequencies of reapplication.

The visual attenuation composition is provided with sufficient colorfastness properties that the visual attenuation composition remains for stays a predetermined amount of time at a desirable color, following application. In some instances, the desirable color is a shade of green that visually matches the surrounding terrain. It is appreciated that the color fastness properties may be implemented for any suitable amount of time dependent upon specific applications at hand.

Any suitable methods may be used to impart the colorfastness properties of the visual attenuation compositions as applied. In one embodiment, the colorant of the visual attenuation composition contains a dye that has certain affinity for the substrate to be applied to. By way of example, the substrate includes erosion control mats, erosion control tubes, sprayable mulch products, paper, wood, general cellulose fibers, and combinations thereof. A non-limiting list of dyes includes acid dyes, basic dyes, vat dyes, mordant dyes, reactive dyes, disperse dyes, azo dyes, and sulfur dyes.

Acid dyes are water-soluble anionic dyes that are applied to fibers such as silk, wool, nylon and modified acrylic fibers. Attachment to the fiber is attributed, at least partly, to salt formation between anionic groups in the dyes and cationic groups in the fiber. Basic dyes are water-soluble cationic dyes often used on acrylic fibers, cotton, paper, wool, silk, and nylon. Vat dyes are generally insoluble in water and renders affinity for textile fibers when present in an alkaline condition. Reactive dyes become attached to natural fibers by forming covalent bonds. Disperse dyes are substantially water insoluble. When present in an elevated temperature, the disperse dyes are often used to dye nylon, cellulose triacetate, and acrylic fibers.

By employing different types of dyes, optionally in concert with a particular choice of pigment, the visual attenuation composition can be formulated to impart variable colors and or colorfastness as desirable.

In some instances, a mordant is used to impart certain light fastness properties to the visual attenuation composition as applied. Mordant dyes require a mordant, which improves the fastness of the dye against water and light. The choice of mordant is very important as different mordants can change the final color significantly. Most natural dyes are mordant dyes. One example of a mordant is potassium dichromate. Without being limited to any particular theory, a mordant helps on colorfastness by forming an insoluble compound with the colorant such as a dye, a pigment, or both. A non-limiting list of mordants includes tannic acid, alum, chrome alum, sodium chloride, and certain salts of aluminum, chromium, copper, iron, potassium, sodium and tin. All these are well known to one skilled in the arts of dyes and dyeing techniques.

The mordant can be supplied separately from and combined with the colorant including dyes and or pigments prior to application. The mordant can also be supplied together with the colorant depending on the substrate type. Metallic mordants are soluble in water and are loosely held by the paper and cotton fibers. The paper and cotton fibers are first treated with oil or tannic acid, then with a solution of mordant, and then followed by the dye and pigment composition.

When a pigment is used as the colorant described herein, the pigment is supplied to an amount of 3 to 75 lbs, preferably 5 to 66 lbs, and more preferably 10 to 45 pounds (lbs) per ton of the total weight of the final product.

The dyes and pigments may be natural or synthetic. Non-limiting examples of the pigments include various iron oxides, carbon, and titanium dioxide. Other colorants that may be used include tannins, vegetable tints, other natural colorants derived from plants, synthetic dyes, food colorings, and the like. Preferably, the colorants are non-toxic. A colorant may be used individually or blended with another colorant to obtain any desired color. The water-based medium may be provided to the visual attenuation composition as a liquid carrier or solvent, to help suspending, dispersing or stabilizing the colorant for application. The colorant includes any number of suitable dyes. Common colors for the colorant may comprise green to simulate grass or pink to simulate a flower bed. Of course, depending on the application, different color colorant can be utilized to achieve a particular effect. The color of the colorant generally does not have an effect on the performance of the mulch; rather the dye facilitates an aesthetic appearance.

The visual attenuation composition can be formulated to impart a shade of green to the substrate when applied. Green is a color, the perception of which is evoked by light having a spectrum dominated by energy with a wavelength of about 520-570 nanometers. Pigment and dyes, alone or in combination, that impart the color of green can be derived from green minerals, including the emerald, chromium oxide, copper carbonate, oxidized cobalt and zinc. Some minerals reflect the color green, rather than emitting it through luminescent or phosphorescent qualities.

Optionally, the visual attenuation composition is formulated as sprayable foam. When supplied as a foam, the visual attenuation composition is applied onto the substrate as a surface coating. This reduces cost, weight and subsequent drying time. Alternatively, the colorant is supplied as an aqueous mist, a dispersion, or a slurry.

Non-limiting examples of the substrate to which the visual attenuation composition can be applied include: mulch, sand, gravel, rocks or stone, pavers or concrete blocks, slag, soil, leaves, fertilizer (including commercial synthetic fertilizer (NPK) and pelletized sewage sludge and/or animal waste), compost, aggregates, quartzite, lava rock, grass/turf, peat moss, and particularized rubber or other polymeric material. Mulch may be virgin or recycled materials, and may include, for example, wood chips, wood shavings or fibers (including particularized wood waste and green wood), sawdust, pine needles, bark, paper, straw, bagasse, leaves, wheat and oat hulls, rice waste product, palm tree waste, palmetto, bamboo, food or vegetable-derived mulches, polymeric materials, other botanical or agricultural waste products, and combinations thereof.

A surfactant is used to reduce the surface tension of the visual attenuation composition as applied. The surfactant optionally has a foam-forming behavior. Non-limiting examples of the foam-forming surfactant include anionic surfactants, but some cationic and non-ionic materials also foam well. In general, the anionic materials are less expensive. When making foam with only water, anionic surfactants can be used at low concentrations, preferably in the range of 1000 ppm to 2000 ppm actives, with a minimum concentration of usually about 200 ppm and a maximum concentration limited only by the solubility of the surfactant being used. When additional non-foaming ingredients are added to a foaming system, for instance, pigments, polymer, dispersants, and other water insoluble materials, in general, the concentration of surfactant may need to be increased and the type of surfactant altered to support the extra materials in the composition.

According to another aspect of the present invention, there is provided a visually attenuated sprayable mulch composition, and in particular visually attenuated sprayable porous mulch composition, for application to soil surfaces in a number of commercial markets, including gardening, grounds maintenance, landscaping, highway roadside construction and maintenance, landfills, mining, slope stabilization, turf reinforcement systems, roof greening, and agriculture, to name a few. The porous mulch may be visually attenuated using methods described herein. The porous mulch may be colored with the visual attenuation composition during manufacture and thereafter packaged for later use. Alternatively, the porous mulch may be provided as non-colored packages during manufacture and are combined with the visual attenuation composition described herein prior to use at the application site. In addition, the mulch product may also contain natural binders, traditional organic and inorganic mulch fibers, soil amendments including fertilizers, compost, herbicides, and pesticides, and when appropriate, seeds, stolons and other forms of live plant materials.

The mulch fibers composition may comprise 75-98% by weight of mulch. The weight ratio of mulch fibers to chemical binder is 7 to 30:1 or preferably 10:1. Water is added to the mixture to form the hydraulic slurry prior to introducing the particulate component such as porous ceramic particles. Alternatively, the particulate component is premixed with the other mulch components to form a mulch mix and the mulch mix is combined with water to form a sprayable slurry at the site of application.

The visually attenuated porous mulch composition contains fibrous substance. The fiber can be crimped or non-crimped natural fibers, crimped or non-crimped synthetic fibers, crimped or non-crimped manmade fibers, or any combinations thereof. When used, the natural fibers illustratively include wood, straw, coir and jute fibers, cotton, flax, paper, compost or a mixture thereof. In certain particular instances, the fiber includes poly lactic acid (PLA). When used, the synthetic fibers illustratively include polyester fibers, polypropylene fibers, and combinations thereof. Both the natural fibers and the synthetic fibers can be crimped or non-crimped dependent upon the particular application at hand. Further, the natural fibers and or the synthetic fibers can be mechanically or chemically bonded to form a bonded fiber component.

The average fiber length can be at least 1/8 inch (3.175 mm), and preferably at least 3/16 inch (4.762 mm). Selection of fibers for manufacturing may be enhanced by a rotap classifier utilizing, 8, 16, 24, 50 and 100 mesh sieves retaining a minimum of 30% or more of the screened fibers on the 8, 16 & 24 combined sieve collection. The fibers selected are optionally treated, preferably with a polymer-based water absorbent, added to the fiber mulch to establish the high viscosity required to suspend the porous ceramic particles within the matrix. Suspending polymer agents such as guar gum, pectin, gelatin, carrageenan, psyllium, chitosan, bean mills, polyacrylamides and/or sodium polyacrylate may be used in a quantity required to preferably achieve a minimum slurry viscosity of 300,000, 500,000, 750,000, or 1,000,000 centipoises, when evaluated by a SST2000 Rheometer with vane V4-20 at 22 degrees C.

In order to facilitate suspension of the mulch and porous particles for spraying purposes, the mulch matrix and porous ceramic particles may be suspended in a highly viscous slurry with a consistency of pudding. The high viscosity slurry may be formed with a crosslinked or non-crosslinked hydrocolloid binder. Although a crosslinked hydrocolloid binder such as an agar, carrageenan, gelatin, pectin or guar gum is the preferred slurry ingredient, other suspending agents such as polyacrylamide, sodium polyacrylate, polyvinyl alcohol, psyllium, chitosans, starches, bean mills and mixtures thereof may be used as the suspending agent. Additional suspending agents are well known to those skilled in the art, and include, without limitation, associative thickeners, water soluble polymers of numerous types, naturally occurring saccharide-based polymers such as starches and soluble lignocellulosic digestion products, and proteins. Chemically derivatized celluloses are also useful, examples being methyl cellulose, propyl cellulose, hydroxymethyl cellulose, hydroxypropyl cellulose, carboxymethyl cellulose and the like.

A particulate component such as porous particles may be added to the fiber mulch during manufacture or at the site of use, for instance, prior to dispensing of the fiber and slurry composition from mulch spraying equipment. Likewise, the addition of soil amendments such as fertilizer, compost, herbicides, pesticides and when appropriate, seeds, and other forms of live plant material may be added during the fiber mulch preparation or prior to dispensing of the fiber and slurry composition from mulch spraying equipment. The combination of porous ceramic particles with the mechanically and/or chemically modified fiber mulch matrix enhances use of natural fibers to create a highly effective resultant mulch product. These enhanced formulations retain the matrix properties to preserve vertical movement of water and oxygen while increasing the density of the fiber matrix allowing for higher rates of kinetic energy (force) absorption of large diameter raindrops falling at terminal velocity from intense storms and resulting overland flow (shear stress) over long slope surfaces or in areas of concentrated flow such as drainage ditches, channels and shorelines.

Among other things, the inclusion of a particulate component in the visually attenuated porous mulch composition helps to improve erosion control and plant establishment performance. Without being limited to any theory, the particulate component, as combined with the other mulch components, helps to increase the extent of water and oxygen penetration into the soil layers and hence improves seed germination and plant growth.

The particulate component may include porous particles such as porous ceramic particles and non-porous particles such as sand. The preferred porous particle is a porous ceramic particle which is clay-based and marketed by Profile Products, LLC of Buffalo Grove, Ill. These porous ceramic particles are believed to preserve water and oxygen flow to plant root systems in easily compacted soils. The porous ceramic particles should be of sufficiently small size to facilitate combination and use in a viscous hydraulic mulch matrix. In development of the sprayable hydraulic mulch product the smaller the porous particle size, the better retention of moisture and distribution throughout the fiber mulch matrix.

The final concentration may provide from one million particles to 50 million particles per pound (2.2 million particles to 110 million particles per kilogram). The final concentration may be determined by the desired moisture retention and erosion control performance required for the target soil surface, slope gradient, slope length, annual rainfall rate and the anticipated storm intensity run off conditions.

While porous ceramic particles are the preferred slurry ingredient to increase the density and pore space of the fiber matrix, other particles such as perlite, vermiculite, zeolite, Fuller's earth, diatomatious earth, clay or mixtures and/or crushed aggregates thereof can also be used to deliver comparable performance in enhancing erosion control and vegetative establishment of the hydraulically-applied mulch matrix. Other particularly suitable clays are the smectite clays such as bentonite, montmorillinite (preferred), beidellite, nontronite, hectorite, saponite, attapulgite, sepiolite and mixtures thereof.

The incorporation of a high density particle such as sand with little or no pore space contribution will also enhance the erosion control performance of the applied hydraulic slurry by increasing the density of the installed fiber matrix, allowing for this matrix to absorb the rain drop energy more efficiently than if the particles were not included within the matrix.

The visually attenuated porous mulch compositions are preferably formulated to be provided with a viscosity suitable for hydraulic applications. The introduction of the porous ceramic particles within the hydraulic fiber mulch requires a highly viscous slurry, whose viscosity is dependent upon the physical properties of the particles, for example their size, density, and morphology. The viscosity is adjusted so as to be able to maintain the particles in suspension such that a uniform mixture can be sprayed. This viscosity is preferably at least 300,000, 500,000, 750,000 or 1,000,000 centipoises (cps) when evaluated by an SST2000 Rheometer with vane V4-20 at 22 degrees C. which facilitates the retention of the particles within a viscous hydraulic mulch matrix when applied with standard mulch spraying equipment. However, in some cases, the viscosity may be lower, for example 500,000 cps or 300,000 cps. In the quiescent state (no or very low shear), the viscosity may reach very high values. However, the viscosity under shear should be low enough that the composition remains sprayable.

For hydraulic applications, the sprayable mulch composition is preferably formulated as a high viscosity slurry having a solids content in a range of 15 to 98 kg/100 m2 when dispersed. The density of the matrix has direct relationship to erosion control performance, wherein the higher the density or weight per unit area, the greater the raindrop splash and erosive water energy dissipation.

The ratio of mulch solids, i.e. natural and synthetic fibers to inorganic particles is preferably in the range of 1:10 to 10:1, more preferably 1:5 to 5:1, yet more preferably 1:3 to 3:1, still more preferably 1:2 to 2:1, and most preferably about 1:1.

According to another aspect of the present invention, there is provided a visually attenuated biological soil treatment composition for improving the soil biology of adventitious plants and a method for delivery directly to the plant root systems. The biological soil treatment composition is colored using the visual attenuation composition described herein elsewhere.

However, use of biological soil treatments is limited in that once the sod/grass is established, there is no efficient way to reach the roots to treat large areas, or to innoculate areas that did not receive an effective amount of the biological soil treatment formula. In order to ensure a sufficient amount, the tendency is to over-innoculate rather than under innoculate the soil in preparation for laying sod/turf, greatly increasing the expense of the soil treatment.

Conventional soil treatments are provided with microbes, fungal spores, and other organic nutrients mixed within. These compositions tend to separate and quickly get eroded over time, and when erosion happens, the entire composition has to be replaced. These dry soil treatments are generally delivered to the soil prior to laying down sod or grass seed using a drop spreader with a tiller which generally results in an up to 10% material loss due to wind erosion. Therefore, conventional soil treatments are costly at least in this regard. Many vendors recommend immediately wetting the soil after inoculation to reduce the amount blown away. Biological soil treatment formulations when prepared in solution generally have a reduced shelf life and require adequate mixing to ensure delivery of the appropriate concentration of the soil treatment.

Landscapers, greens keepers and sports grounds keepers look for the most cost-effective way to maintain large acres of sports turf, grass and landscapes. They search for the best methods for soil preparation prior to laying new turf and when a soil treatment fails, it is costly to replace these entire areas of dead sod. Therefore, there is a need in the industry to overcome the problem of delivery of biological soil treatments to mature, stable lawns, sports turf and landscaping without disturbing or replacing the sod surface. There is also a need for an improved system of direct delivery of biological soil treatments to the rhizosphere of the root systems with minimal loss of product.

The visually attenuated biological soil nutrient system is provided to allow application prior to and after sod, turf and greens installation and to rapidly deliver such nutrient systems over large acres of golf greens and sports turf without a rapid turnaround time for their intended use.

The visually attenuated soil treatment composition is provided to deliver to the soil roots beneficial microorganisms such as bacterial and fungi. The microorganisms form symbiotic rhizomes on the roots system to facilitate food and water usage by the plant. In particular, the soil treatment composition contains at least one particulate component such as porous ceramic particles or non-porous sand as described herein, which protects the biological soil treatment from wind and water erosion and, due to its size, reduces loss of the soil treatment from the treated area. This protection has been shown to facilitate the significant increase in biological activity of the microorganism.

In certain particular instances, and as illustrated in FIG. 1, the biological soil treatment composition contains symbiotic *Glomus* fungal species and the symbiotic *Bacillus* bacterial species as the microorganism, the porous particles 10 as described herein elsewhere, and additionally contains a carbohydrate food source 12. In a variation of this embodiment, the porous particles are porous ceramic particles. Suitable porous particles include those commercially available as Profile Porous Ceramic particles by Profile Products, LLC of Buffalo Grove, Ill. In a refinement of the present embodiment, the particles porosity is from 60 to 90 volume percent. In another variation, the particles porosity is from 64 to 85 volume percent. They are generally dispensed in a bulk density of 945 pounds per cubic yard.

However, due to the natural porosity of this clay-based ceramic particle, when mixed with a biological soil treatment the dormant organisms, nutrients, and growth media become embedded within the pores of the ceramic particle. In one variation, the microorganisms when combined with the porous ceramic particles are mixed in a range of approximately 0.01%-20% by weight of porous ceramic particles. In a refinement of this embodiment, the microorganisms are combined with the porous ceramic particles in a range of approximately 0.10%-3.0% by weight of porous ceramic particles. The porous ceramic particles provide protection to the microorganisms from wind, water erosion and increase the amount of biological soil treatment available to the plant root systems.

The visually attenuated biological soil treatment composition may comprise endomycorrhizial and ectomycorrhizial symbiotic fungi, a symbiotic bacteria and beneficial nutrients for the soil. The preferred biological soil treatment composition contains endomycorrhizial fungi, specifically, *Glomus intraradices, Glomus mosseae, Glomus aggregatum* and *Glomus etunicatum*, or a mixture thereof. These species have the ability to attach to root systems in a symbiotic relationship or form spores and thus survive during a long winter. The preferred symbiotic soil bacteria from the *Bacillus* species which are also spore formers include, *Bacillus licheniformis, Bacillus megaterium, Bacillus oleronius, Bacillus pumilis, Marinibacillus marinus* (formerly *Bacillus marinus*) and *Paenibacillus lentimorbus* (formerly *Bacillus lentimorbus*), or a mixture thereof.

The biological organisms may be grown separately, in organism-specific media, as to species *Bacillus* or *Glomus* or grown in generic media promoting growth for both the fungi and bacteria. The preferred embodiment may utilize organisms purchased in a liquid bath which controls dormancy. Alternatively, these organisms may be purchased in a dried, freeze dried or frozen state, mixed in the desired combination and directly added to the biological soil treatment composition.

The composition may also contain soil and plant macronutrients and micro-nutrients 18 as well as biological nutrients to promote the growth and development of the fungi and bacteria. A carbohydrate is added to the organism's liquid bath. The plant nutrients include plant hormones 20, such as auxins and cytokinins. The soil/plant nutrients may include phosphorous, nitrogen and potassium. Other nutrients may also include agents such as humic acid 22. These nutrients may be lost over time due to improper fertilization. The micro-nutrients are chosen to promote a rich environment for the root systems and these choices must be balanced with an environment favorable to the biological organisms. Although other components may be included, a preferred biological soil treatment composition is listed in Table 1.

TABLE 1

Biological Soil Nutrient Composition

Ingredients

*Glomus* species
*Bacillus* species
Soil/Plant Macro-Nutrients: Phosphorous, nitrogen, calcium, magnesium, sulfur and/or potassium; and plant hormones, including auxins and cytokinins
Soil/Plant Micro-Nutrients: Manganese, iron, boron, zinc, copper, molybdenum and/or chlorine
Biological Nutrients: Carbohydrates, i.e. starch
Other Nutrients: Biostimulants, including Humic acid The biological soil treatment composition is used to impregnate the porous ceramic particle 10, which contain pores and channels which will provide a natural biological environment for the delivery and development of the microorganisms.

The porous ceramic particle 10 provides a delivery vehicle for optimum placement of the microorganisms close to the root system and due to its size retains its location in the soil. This method of root treatment is superior to soil treatment compositions commercially available as powders and sprays, which may be easily diluted and washed deeper into the soil away from the root systems.

The preferred method of preparation is by spraying the porous particles with the biological soil treatment composition. The particles have a zero to 4% moisture content, which promotes absorption of the soil treatment composition into the particle pore space. The maximum particle moisture content is 10% to ensure the organisms remain dormant. Moisture content greater than 14% is required to activate the growth cycle of the dormant organisms. In certain particular instances, a moisture content of about 8% is preferred for a final product coming out of a manufacturing plant. The clay-based porous ceramic particles or other porous particles may be processed by treatment with the biological soil composition to form a biological soil nutrient system. Once the biological soil nutrient system is mixed with soil and hydrated the microorganisms become active.

In a preferred embodiment, the biological soil nutrient system is delivered to the soil by a hydro injection system. In the field of soil biology, aeration of the soil is necessary for successful growth of plants by ensuring the root systems have adequate access to air and water. The grounds maintenance industry utilize different types of equipment to promote aeration of the soil. An industry leader in the field of grounds maintenance developed the DryJect™ system which is manufactured by DryJect Manufacturing, LLC in Hatboro, Pa., a Profile Products, LLC company. This hydro injection system is utilized to relieve soil compaction which stifles root systems and reduce standing water on the surface of the lawn and/or turf. The DryJect™ equipment uses water to fracture the soil with the capability of simultaneously injecting large volumes of dry fertilizers, inorganic soil treatments and pesticides that allow golf courses, and similar surfaces, to be usable in one hour after treatment. The hydro injection system utilizes water to produce a high pressure aeration hole approximately ¼ by ½ inch wide and from 2-10 inches deep depending the setting and depth of root system in the soil. The penetrating force of the hydro injection system allows the insertion of the nutrients to the root system. The aeration achieved through the use of conventional methods is very temporary and the aeration holes close after a short time. The soil treatment composition as described herein helps to solve aeration issues associated with conventional use and to revolutionize turf and lawn maintenance as well as enhance other agricultural soil nutrient processes.

The treatment area is prepared for aeration and the equipment is calibrated to the appropriate depth of the target root system. The amount of biological soil nutrient system material required, for instance, is calculated as 50 lbs to 250 lbs per 1,000 square feet (sq. ft.). The hydro injection system is loaded with the amount of biological soil nutrient system for the treatment area and initiates delivery to the soil. Alternatively, the soil can be manually prepared to form aeration holes and the biological soil nutrient system is placed into the holes by raking manually. The manual method is particularly suitable for relatively smaller areas such as gardens and smaller lawns.

EXAMPLES

Example 1

A package of a blended mulch containing porous ceramic particles (of Example 4 shown below) is mixed, at the site of application, with copperthalocyanide (by Sun Chemical) as the colorant at a weight ratio of 15 lbs per ton of the blended mulch. The blended mulch mixed with the colorant is added to a hydro-seeder tank prefilled with water to form a mulch slurry. This colored mulch slurry is spray-applied to an area of a landscape for seed germination. The color of the blended porous mulch as applied is found to remain with no visible fading for a period of about 5 weeks.

Example 2

The blended mulch used in this example is of the same composition as used in Example 1, with the exception that blended mulch and in particular the fibers contained therein are pre-colored, at a manufacturing plant, with the copperthalocyanide as the colorant. The pre-colored blended mulch is then provided in dry product packages and to be used at the site of application upon combination with water to form a sprayable slurry. The color of the blended porous mulch as applied is similarly found to remain with no visible fading for a period of about 5 weeks.

Example 3

The color of the blended porous mulch as applied in Examples 1 and 2 is reinforced to effectuate a desirable colorfastness value of up to 6 months. In particular, a water slurry containing copperthalocyanide at a concentration of 40 pounds per ton of the water is spray-applied onto the blended porous mulch that has been laid down. The spray application is repeated once with a time interval of about 10 minutes in between the two applications. The color of the blended porous mulch after the color reinforcement treatment is found to remain without noticeable fading for a period of 5 months.

Example 4

Fiber mulch formulations were tested with and without porous ceramic reinforcement. Improvements in slope length stabilization, shear stress testing, wet tensile strength and water retention. Two studies, slope and shear stress testing were performed at Utah State Water Research Laboratory, utilizing their rainfall simulator and channel testing flume. Rainfall testing utilizing: 1) 4 feet plot width, 2) 19.5 feet plot slope width, 3) 2.5:1 (horizontal:vertical) plot slope, 4) Sandy loam soil type, 5) 5.0 and 7.15 inches per hour rainfall intensity, 6) 1 hour testing duration, and 7) Shear stress testing.

The Slope Length Benefit was calculated for the fiber mulch formulation, with a reinforcement particles, was found to have a cover management factor at 7.15" (inches) per hour of 0.0049. The cover management factor for the fiber mulch formulation without reinforcement particles at 5" per hour, was 0.0004. Providing evidence that the fiber mulch formulation in combination with reinforcement particles improves cover management by at least 85%. In addition, slope length stabilization was calculated using Rusle, and the fiber mulch formulation in combination with porous ceramic particle reinforcement can increase the slope length stabilization by a factor of 1.85. For example, if an FGM matrice can stabilize a 100 ft. long slope, then an FGM matrice reinforced with porous ceramic particles can extend the slope length protection to 185 ft. without the need of an energy interrupter device.

Shear testing, wet tensile strength and water retention were also performed on the fiber mulch formulation. The Bonded Fiber Matrix (BFM) mulch formulation, reinforced with porous ceramic particles infilled within a Turf Reinforcement Matrix (TRM) was found to have shear capability of 2.5 lbs/sq ft. and 106.9% improvement versus a BFM and TRM that had not been reinforced with porous ceramic particles. A wet tensile strength under 4"×5" of water averaged 1.96 lbs was calculated for the BFM with reinforcement particles formulation, which was a 98% improvement over the test material without reinforcing particles for the BFM. Water retention was calculated as 69.35 grams for the cured Flexible Growth Medium (FGM) matrix with reinforcement particles for a 26.225 square inch area, an improvement of 10.5% versus an unreinforced FGM matrix.

The mulch applied in this test contained a 1:1 ratio of fiber mulch to ceramic particles, and was spray applied at a rate of 7000 lbs/acre. The amount applied can be considerably less, depending upon the particular application, topography, etc., for example 2000 lbs/acre, and can also be more, for example 10,000 lbs/acre.

While an embodiment of the invention has been illustrated and described, it is not intended that the embodiment illustrates and describes all possible forms of the invention. Rather, the words used in the specification are words of description rather than limitation, and it is understood that various changes may be made without departing from the spirit and scope of the invention.

What is claimed is:

1. A visually-attenuated sprayable mulch composition for hydraulic application to a landscape, comprising:

at least one fiber selected from the group consisting of natural fibers that are crimped or non-crimped, synthetic fibers that are crimped or non-crimped, and combinations thereof, the at least one fiber including polylactic acid; and a colorant to visually attenuate or camouflage the mulch composition as applied to the landscape to approximate color characteristics of a surrounding natural terrain, the colorant being selected from the group consisting of a pigment, a dye, and combinations thereof.

2. The visually-attenuated mulch composition of claim 1, wherein the colorant provides a color of green to the mulch composition as applied and the color of green substantially remains for a period of up to 2 to 8 weeks.

3. The visually-attenuated mulch composition of claim 2, wherein the colorant includes at least one of phthalocyanine and copperthalocyanide.

4. The visually-attenuated mulch composition of claim 1, wherein the colorant is selected to approximate, for a period of up to 2 to 6 months, the surrounding terrain's color characteristics of being red, yellow, blue, white, black, green, brown, pink, and combinations thereof, and the colorant includes at least one pigment selected from the group consisting of arsenic pigments, carbon pigments, cadmium pigments, iron oxide pigments, chromium pigments, cobalt pigments, lead pigments, copper pigments, titanium pigments, ultramarine pigments, mercury pigments, zinc pigments, clay earth pigments, iron oxides, pigments of biological origin, organic pigments, and combinations thereof.

5. The visually-attenuated mulch composition of claim 1 further comprising at least one manmade biodegradable crimped or non-crimped fiber.

6. The visually-attenuated mulch composition of claim 1 further comprising at least one particulate component selected from the group consisting of porous particles, non-porous particles, and combinations thereof.

7. The visually-attenuated mulch composition of claim 6, wherein the at least one particulate component includes porous particles selected from the group consisting of porous ceramic particle, smectite clay, perlite, vermiculite, zeolite, Fuller's earth, diatomatious earth, and combinations thereof.

8. The visually-attenuated mulch composition of claim 1 further comprising a mordant to impart colorfastness of the mulch composition for a period of up to 2 to 6 months.

9. The visually-attenuated mulch composition of claim 1 further comprising a suspending agent selected from the group consisting of agar, carrageenan, gelatin, pectin, guar gum, polyoxyethylene polyether, a polyacrylamide, a sodium polyacryalte, psyllium, chitosan, starch, bean mills, and combinations thereof.

10. The visually-attenuated mulch composition of claim 9, wherein the suspending agent is provided in an amount of no greater than 15% by weight of the total solids of the mulch composition.

11. A visually-attenuated mulch composition comprising:
at least one fiber selected from the group consisting of natural fibers that are crimped or non-crimped, synthetic fibers that are crimped or non-crimped, and combinations thereof, the at least one fiber including polylactic acid;
at least one grass seed; and
a colorant providing a color to the mulch composition as applied and the color substantially remains for a period of up to 2 to 8 weeks for seed germination, wherein the colorant is selected from the group consisting of a pigment, a dye, and combinations thereof.

12. The visually-attenuated mulch composition of claim 11 further comprising at least one fertilizer.

13. The visually-attenuated mulch composition of claim 11, wherein the colorant substantially effectuates a color of green or a color of brown to the mulch composition as applied.

14. The visually-attenuated mulch composition of claim 11 formulated as dry flakes.

15. A visually-attenuated sprayable soil treatment composition for hydraulic application to a landscape, comprising at least one fiber including polylactic acid:
at least one symbiotic microorganism selected from the group consisting of symbiotic fungi, symbiotic bacterial, and combinations thereof;
at least one particulate component supporting the at least one symbiotic microorganism; and
a colorant to visually attenuate or camouflage the soil treatment composition as applied to the landscape to approximate color characteristics of a surrounding natural terrain, the colorant being selected from the group consisting of a pigment, a dye, and combinations thereof.

16. The visually-attenuated sprayable soil treatment composition of claim 15 further comprising a mordant to impart colorfastness of the soil treatment composition for a period of up to 2 to 6 months.

17. The visually-attenuated sprayable soil treatment composition of claim 15 further comprising at least one of a humic acid and a carbohydrate source.

18. The visually-attenuated sprayable soil treatment composition of claim 15, wherein the colorant is selected to approximate, for a period of up to 2 to 6 months, the surrounding terrain's color characteristics of being red, yellow, blue, white, black, green, brown, pink, and combinations thereof, and the colorant includes at least one pigment selected from the group consisting of arsenic pigments, carbon pigments, cadmium pigments, iron oxide pigments, chromium pigments, cobalt pigments, lead pigments, copper pigments, titanium pigments, ultramarine pigments, mercury pigments, zinc pigments, clay earth pigments, iron oxides, pigments of biological origin, organic pigments, and combinations thereof.

19. A method for visually attenuating or camouflaging a soil treatment product as applied onto a landscape, comprising:
contacting the soil treatment product as applied with a visual attenuation composition including a colorant selected from the group consisting of a pigment, a dye, and combinations thereof to approximate color characteristics of a surrounding natural terrain, the soil treatment product being at least one of a mulch composition of claim 1, or a mulch composition of claim 11, or a soil treatment composition of claim 15.

20. The method of claim 19, wherein the colorant is selected to approximate, for a period of 2 to 6 months, the surrounding terrain's color characteristics of being red, yellow, blue, white, black, green, brown, pink, and combinations thereof, and the colorant includes at least one pigment selected from the group consisting of arsenic pigments, carbon pigments, cadmium pigments, iron oxide pigments, chromium pigments, cobalt pigments, lead pigments, copper pigments, titanium pigments, ultramarine pigments, mercury pigments, zinc pigments, clay earth pigments, iron oxides, pigments of biological origin, organic pigments, and combinations thereof.

21. The method of claim 19, wherein the contacting is carried out via a spray application using a pump sprayer, a hydro seeder, a hydromulcher, a water truck, a spray rig, or combinations thereof.

22. The method of claim 19, wherein the visual attenuation composition further comprises an additive selected from the group consisting of a flocculant, a tackifier, a stabilizer, and combinations thereof.

23. The method of claim 19, wherein the visual attenuation composition further comprises a mordant to impart colorfastness of the soil treatment product as applied for a period of up to 2 to 6 months.

24. A method for providing mulch to a landscape while visually attenuating or camouflaging the landscape, comprising:
providing a mulch composition containing at least one fiber selected from the group consisting of natural fibers that are crimped or non-crimped, synthetic fibers that are crimped or non-crimped, and combinations thereof, the at least one fiber including polylactic acid;

combining the mulch composition with a visual attenuation composition including a colorant selected from the group consisting of a pigment, a dye, and combinations thereof to form a visually-attenuated mulch composition to approximate color characteristics of a surrounding natural terrain; and contacting the landscape with the visually attenuated porous mulch composition by hydraulic application.

25. The method of claim 24, wherein the step of combining is carried out by an end user at the site of application.

26. The method of claim 24, wherein the step of combining is carried out at a manufacturing plant.

27. The method of claim 24, wherein the hydraulic application for the step of contacting is carried out by the use of a pump sprayer, a hydroseeder, a hydromulcher, a water truck, a spray rig, or combinations thereof.

28. A method of providing biological soil treatment to a landscape while visually attenuating or camouflaging the landscape, comprising:

providing a biological soil treatment containing at least one particulate component, at least one fiber including polylactic acid, and at least one symbiotic microorganism supported on the at least one particulate component and being selected from the group consisting of symbiotic fungi, symbiotic bacterial, and combinations thereof;

combining the biological soil treatment composition with a visual attenuation composition including a colorant selected from the group consisting of a pigment, a dye, and combinations thereof to form a visually attenuated biological soil treatment composition to approximate color characteristics of a surrounding natural terrain; and contacting the landscape with the visually attenuated biological soil treatment composition by hydraulic application.

29. The method of claim 28, wherein the step of combining is carried out by an end user at the site of application.

30. The method of claim 28, wherein the step of combining is carried out at a manufacturing plant.

31. The method of claim 28, wherein the hydraulic application for the step of contacting is carried out by the use of a pump sprayer, a hydroseeder, a hydromulcher, a water truck, a spray rig, or combinations thereof.

* * * * *

UNITED STATES PATENT AND TRADEMARK OFFICE
CERTIFICATE OF CORRECTION

PATENT NO.       : 8,256,158 B2
APPLICATION NO.  : 12/496907
DATED            : September 4, 2012
INVENTOR(S)      : Kevin S. Spittle It is certified that error appears in the above-identified patent and that said Letters Patent is hereby corrected as shown below:

Column 15, Line 60, Claim 15:

After "polyactic acid" delete ":" and insert -- ; --

Signed and Sealed this
Twenty-seventh Day of November, 2012

David J. Kappos
*Director of the United States Patent and Trademark Office*